United States Patent [19]
Jacobs et al.

[11] Patent Number: 5,820,452
[45] Date of Patent: Oct. 13, 1998

[54] METHOD AND DEVICE FOR RELEASING INTESTINES

[75] Inventors: Thomas Gerardus Maria Jacobs, Doetinchem; Johannes Wilhelmus Paulus Te Maarssen, Groenlo; Sander Antonie Van Ochten, Lichtenvoorde, all of Netherlands

[73] Assignee: Stork R.M.S. B.V., Lichtenvoorde, Netherlands

[21] Appl. No.: 677,766

[22] Filed: Jul. 10, 1996

[30] Foreign Application Priority Data

Jul. 24, 1995 [NL] Netherlands ............................ 1000877

[51] Int. Cl.⁶ ........................................................ A22B 5/00
[52] U.S. Cl. ............................................. 452/117; 456/106
[58] Field of Search ................................. 452/117, 118, 452/106, 125, 134

[56] References Cited

U.S. PATENT DOCUMENTS

| | | |
|---|---|---|
| Re. 32,666 | 5/1988 | Ketels . |
| 65,504 | 6/1867 | Pryor . |
| 3,266,542 | 8/1966 | Paoli . |
| 3,402,426 | 9/1968 | Wexel ...................................... 452/160 |
| 3,780,191 | 12/1973 | Langer et al. . |
| 4,019,222 | 4/1977 | Scheler et al. ........................... 452/117 |
| 4,137,605 | 2/1979 | van Rij et al. . |
| 4,232,425 | 11/1980 | Wojcik . |
| 4,361,590 | 11/1982 | Wojcik . |
| 4,577,369 | 3/1986 | Langen et al. . |
| 4,649,600 | 3/1987 | Langen et al. . |
| 4,663,804 | 5/1987 | Langen et al. . |
| 4,674,151 | 6/1987 | Ketels . |
| 4,680,832 | 7/1987 | Langen . |
| 4,779,306 | 10/1988 | Ketels . |
| 4,780,327 | 10/1988 | Gardner-Carimi et al. . |
| 4,862,558 | 9/1989 | Langen et al. . |
| 4,953,794 | 9/1990 | Paoli . |
| 4,993,110 | 2/1991 | Langen et al. . |
| 5,167,977 | 12/1992 | Gamay . |
| 5,326,309 | 7/1994 | Buhot ...................................... 452/160 |
| 5,342,235 | 8/1994 | Watanabe . |
| 5,383,809 | 1/1995 | Paoli . |
| 5,417,376 | 5/1995 | Holmes et al. . |

FOREIGN PATENT DOCUMENTS

| | | |
|---|---|---|
| 479186 | 12/1951 | Canada .................................... 452/118 |
| 0601812 | 6/1994 | European Pat. Off. .......... A22B 5/00 |
| 3164130 | 11/1989 | Japan . |
| 064440 | 1/1979 | U.S.S.R. ................................. 452/106 |
| WO9222210 | 12/1992 | WIPO .............................. A22B 5/00 |

OTHER PUBLICATIONS

*Selo Separator Model D–182*, Seffelaar & Looyen, Inc., Holland, Michigan, collection of trade brochures and forwarding letter dated May 18, 1993.

*Poss*, Poss Limited, Etobicoke, Ontario, Canada, trade brochure; daily assembly procedure, Section 4, pp. 1–16; and start up and operation, Section 5, pp. 1–2.

*Primary Examiner*—Willis Little
*Attorney, Agent, or Firm*—Webb Ziesenheim; Bruening Logsdon; Orkin & Hanson, P.C.

[57] ABSTRACT

A method and device for releasing intestines in a carcass opened on the abdominal side, in particular a sheep, pig or cattle carcass, having the steps of:

placing at least one bracket member in an operative position between the peritoneum and the abdominal wall, moving the bracket member substantially parallel to the spinal column whereby the peritoneum with organs arranged therein is at least partially released from the abdominal wall, and carrying the bracket member from the operative position out of the carcass.

20 Claims, 1 Drawing Sheet

METHOD AND DEVICE FOR RELEASING INTESTINES

The invention relates to a method for releasing intestines in a carcass opened on the abdominal side, in particular of a sheep, pig or cattle carcass. The invention also relates to a device for performing this method.

Release of the intestines from a carcass opened on the abdominal side has heretofore taken place manually. Particularly in an automatic slaughtering line this is a labour-intensive process wherein the working conditions are heavy.

The object of the present invention is to provide a method and device for at least partly automatically releasing intestines from a carcass.

SUMMARY OF THE INVENTION

The invention provides for this purpose a method for releasing intestines in a carcass opened on the abdominal side, in particular a sheep, pig or cattle carcass, comprising the successive steps of:

placing at least one bracket member in an operative position between the peritoneum and the abdominal wall, moving the bracket member substantially parallel to the spinal column whereby the peritoneum with organs arranged therein is at least partially released from the abdominal wall, and carrying the bracket member from the operative position out of the carcass.

The invention also provides a device for releasing intestines in a carcass opened on the abdominal side, comprising:

a feed device for opened carcasses, a manipulator provided with at least one bracket member for placing the bracket member in an operative position between the peritoneum and the abdominal wall, causing the bracket member to move substantially parallel to the spinal column of the carcass, and carrying the bracket member from the operative position to a position outside the carcass, and a discharge device for processed opened carcasses. Automation of the release reduces the personnel required, particularly in a slaughter line; this can result in considerable savings. Another important advantage is that the heavy physical work can be performed by mechanically driven tools and a carcass can be stripped with fewer treatment steps. Yet another advantage is that the danger of the carcass being soiled by liquids present in the intestines can be limited. This simplifies further processing of the carcasses. Finally, it is possible using the invention to realize a more constant quality of processed carcasses. These advantages can be realized by making use of the anatomy of the slaughtered animal. In the abdomen are situated the stomach(s), the duodenum, the small intestine, the large intestine and subsequently the rectum. The outer end of the rectum forms the anus which is joined to the wall of the carcass. At the height of the duodenum are also situated branches of the pancreas, the liver and the spleen. The above intestines and organs are enclosed by the peritoneum. The kidneys moreover are, as it were, fused together with the peritoneum. Between the peritoneum and the abdominal wall is situated a fat layer. By now at least partially breaking the connection between the peritoneum and the abdominal wall it becomes possible to take the said intestines and organs as one whole out of the carcass. The bag-shaped construction formed by the peritoneum holds together the intestines and organs and thereby enables a simpler and less contaminating removal of the objects for removal arranged in the abdominal cavity. An additional important advantage is that, due to the strong adhesion of the leaf fat (fat situated between abdominal wall and peritoneum) to the peritoneum, the leaf fat can also be released from the carcass when the peritoneum is released. The leaf fat thereby no longer has to be removed from the carcass manually or otherwise.

The bracket member is preferably introduced close to the midriff. The carcass is preferably also suspended at least on the hind legs and in the operative position the bracket member is moved substantially in the direction of the hind legs. The insertion can thereby take place on the side of the midriff remote from the peritoneum into a cavity created between the midriff and the lungs. From the side of the midriff remote from the peritoneum the bracket member will be moved in the direction of the hind legs, whereby the midriff is at least partially separated from the carcass. The bracket member is then situated in the operative position between the peritoneum and the abdominal wall. Use can effectively also be made of the weight of the organs for removal. This enhances a uniform releasing movement. Prior to penetration of the bracket member the attachment of the intestinal system to the wall of the carcass is preferably broken at the position of the anus. It thereby becomes possible to also release the connection between the peritoneum and the wall of the carcass in the vicinity of this broken connection.

The device according to the invention, as already described above, is provided with a bracket member which can have any desired form, wherein spoon-shaped, curved rod-shaped, spatula-shaped and other bracket members can be envisaged. Use can be made of a robot arm as manipulator. In practice however, such a solution is rather expensive and use will therefore be made of a drive unit with for instance two or more degrees of freedom.

During the releasing movement substantially parallel to the spinal column the bracket member is preferably displaceable in a direction practically perpendicular to the releasing movement. In a preferred embodiment this movement practically perpendicular to the releasing movement can be controlled by a manipulator. In another preferred embodiment the movement of the bracket member practically perpendicularly of the releasing movement is preferably determined by forces exerted by the carcass on the bracket member. Depending on the shape of the abdominal wall it must also be possible during the releasing movement to move the bracket member in a direction practically perpendicularly of the releasing movement. If the abdominal wall were for instance cylindrical, such a movement would be unnecessary, although in practice the abdominal wall will have a more complex form. The movement substantially perpendicularly of the releasing movement prevents the bracket member being pressed into the abdominal wall or through the peritoneum. This movement of the bracket member substantially perpendicularly of the releasing movement can either be preprogrammed or be controlled by the shape of the carcass. This latter is the case for instance when the bracket member is self-guiding and chooses the path of least resistance between peritoneum and abdominal wall. This can be realized for instance by urging the bracket member under bias toward the abdominal wall.

In a preferred embodiment the bracket member is provided with at least two bracket segments, the outer ends of which are moved toward each other during placing in the operative position such that in the operative position the bracket segments substantially connect to each other. This construction makes it possible to release the peritoneum almost completely from the abdominal wall with a single releasing movement. In this preferred embodiment the peritoneum is anyway almost wholly enclosed by the bracket segments. It is recommended herein that the bracket segments be movable independently of each other during the releasing movement.

In another preferred embodiment the form of the bracket member is adapted to at least a part of the inside of the abdominal wall of the carcass. Herein can be envisaged for instance a curved bracket member whereof the curvature substantially corresponds with the curvature of the inside of the abdominal wall of the carcass.

In yet another preferred embodiment the bracket member is preferably provided with cutting or sawing means. Since the connection between peritoneum and abdominal wall is not everywhere equally strong, it is possible to break strong attachments using cutting or sawing means. Herein can be envisaged for instance the attachment of the lungs to the thoracic membrane. This attachment is so strong that when it is pulled loose a frayed structure results wherein meat can also be pulled from the carcass. Another example are the attachments on the abdominal wall close to the midriff. Use can be made of cutting or sawing means to break these comparatively strong connections.

The present invention will be further elucidated with reference to the non-limitative embodiment shown in the following figures.

DESCRIPTION OF THE PREFERRED EMBODIMENT

Figure 1:
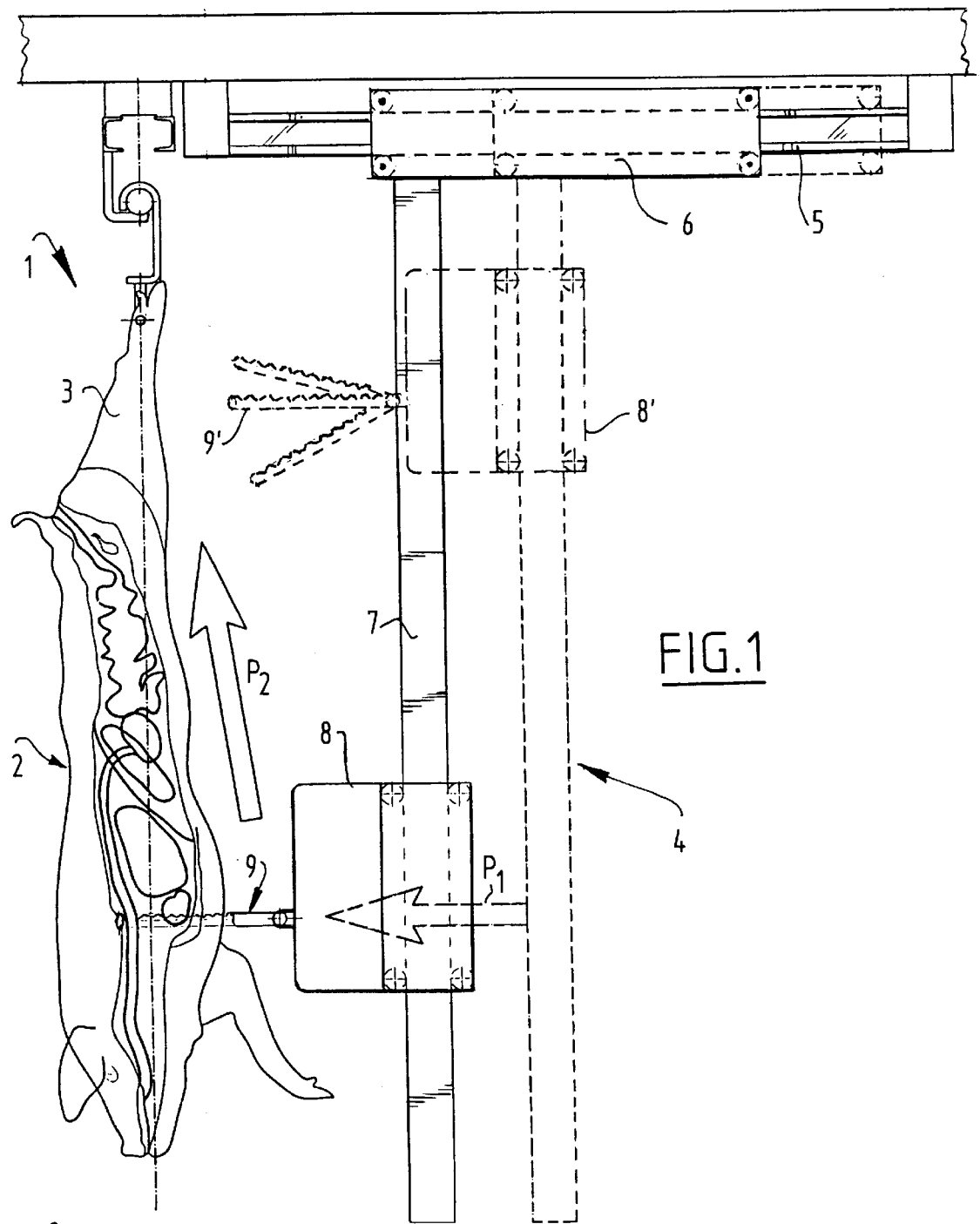
FIG. 1 shows a side view of a device according to the invention.

FIG. 1 shows a device 1 in which a carcass 2 is suspended from the hind legs 3 thereof. The device 1 comprises a manipulator 4 consisting of a horizontal guide 5 along which a horizontal carriage 6 is displaceable. Fixed to the horizontal carriage 6 is a vertical guide 7 along which a vertical carriage 8 is movable. A pivotable bracket member 9 is fixed to the vertical carriage 8. Also shown in this figure in broken lines is a second position of the vertical carriage 8' with bracket member 9'. Also shown here are a number of possible positions of bracket member 9'.

The vertical carriage 8 shown in full lines is carried into an operative position in a direction designated with arrow P1. The bracket member 9 is now situated partly inside the carcass 2. The bracket member 9 can then be moved upward as according to an arrow P2 whereby the releasing process is carried out.

Figure 2:
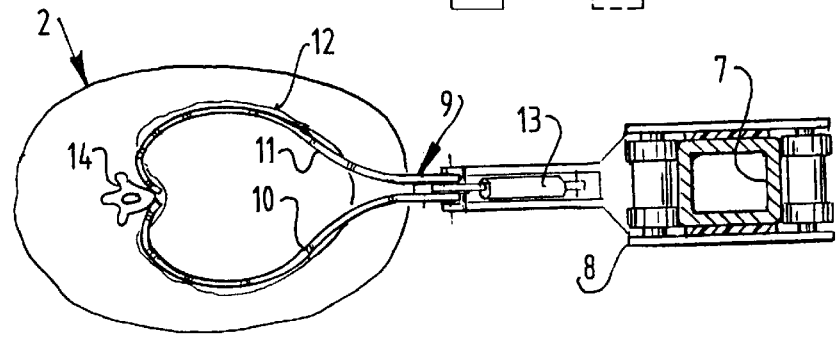
FIG. 2 shows a top view of a bracket member in operative position.

A bracket member 9 consisting of two parts 10,11 is shown in top view in FIG. 2 in operative position. The bracket member parts 10,11 are connected to the vertical carriage 8 with interposing of a cylinder 13. The two parts 10,11 of bracket member 9 are formed such that their shape practically corresponds with the inside of the abdominal wall 12 of carcass 2. The two parts 10,11 of the bracket member almost completely enclose a peritoneum (not shown in this figure). The outer end of the two parts 10,11 almost make contact close to the spinal column 14 of carcass 2. In this figure no means are shown for the displacement of the bracket member parts 10,11 practically perpendicularly of the releasing movement. Numerous constructions are however conceivable for this purpose. This movement practically perpendicularly of the releasing movement can also be applied advantageously during placing of the bracket member 9 in operative position.

We claim:

1. A method for releasing intestines in a carcass opened on an abdominal side, comprising the steps of:

providing at least one bracket member that includes at least two bracket segments having outer ends that substantially abut each other, placing the at least one bracket member in an operative position between the peritoneum and the abdominal wall of the carcass, moving the bracket member substantially parallel to the spinal column, whereby the peritoneum with organs arranged therein is at least partially released from the abdominal wall, and moving the bracket member from the operative position out of the carcass.

2. The method as claimed in claim 1, including introducing the bracket member close to a midriff of the carcass.

3. The method as claimed in claim 1, including suspending the carcass at least on the hind legs and moving the bracket member in the operative position substantially toward the hind legs.

4. The method as claimed in claim 1, including breaking the attachment of the intestinal system to the wall of the carcass at the position of the anus prior to inserting the bracket member into the carcass.

5. A device for releasing intestines in a carcass opened on an abdominal side, comprising:

a feed device for supplying opened carcasses, a manipulator provided with at least one bracket member, wherein the manipulator is configured for placing the bracket member in an operative position between the peritoneum and the abdominal wall of the carcass, causing the bracket member to move substantially parallel to the spinal column of the carcass, and carrying the bracket member from the operative position to a position outside the carcass, and a discharge device for discharging processed opened carcasse, wherein the at least one bracket member includes at least two bracket segments having outer ends that substantially abut each other.

6. The device as claimed in claim 5, wherein during a releasing movement substantially parallel to the spinal columns; the bracket member is displaceable in a direction substantially perpendicular to the releasing movement.

7. The device as claimed in claim 6, wherein movement of the bracket member substantially perpendicular to the releasing movement is controlled by the manipulator.

8. The device as claimed in claim 6, wherein movement of the bracket member substantially perpendicularly of the releasing movement is determined by forces exerted by the carcass on the bracket member.

9. A device for releasing intestines in a carcass opened on an abdominal side, comprising:

a feed device for supplying opened carcasses, a manipulator provided with at least one bracket member, wherein the manipulator is configured for placing the bracket member in an operative position between the peritoneum and the abdominal wall of the carcass, causing the bracket member to move substantially Parallel to the spinal column of the carcass, and carrying the bracket member from the operative position to a position outside the carcass, and a discharge device for discharging processed opened carcasses, wherein the bracket member includes at least two bracket segments having outer ends, and wherein the outer ends are moved toward each other during the placing in the operative position such that in the operative position the outer ends of the bracket segments substantially abut each other.

10. The device as claimed in claim 5, wherein the bracket member is configured such that it substantially corresponds to at least a part of an inside of the abdominal wall of the carcass.

11. A device for releasing intestines in a carcass opened on an abdominal side, comprising:

a feed device for supplying opened carcasses, a manipulator provided with at least one bracket member, wherein the manipulator is configured for placing the bracket member in an operative position between the peritoneum and the abdominal wall of the carcass, causing the bracket member to move substantially parallel to the spinal column of the carcass, and carrying the bracket member from the operative position to a position outside the carcass, and a discharge device for discharging processed opened carcasses, wherein the bracket member includes cutting means and wherein the at least one bracket member includes at least two bracket segments having outer ends that substantially abut each other.

12. The method as claimed in claim 2, including suspending the carcass at least on the hind legs and moving the bracket member in the operative position substantially toward the hind legs.

13. The method as claimed in claim 2, including breaking the attachment of the intestinal system to the wall of the carcass at the position of the anus prior to inserting the bracket member into the carcass.

14. The method as claimed in claim 3, including breaking the attachment of the intestinal system to the wall of the carcass at the position of the anus prior to inserting the bracket member into the carcass.

15. The device as claimed in claim 6, wherein the outer ends of the at least two bracket segments are moved toward each other during placing in the operative position such that in the operative position the bracket segments substantially abut each other.

16. The device as claimed in claim 7, wherein the outer ends of the at least two bracket segments are moved toward each other during placing in the operative position such that in the operative position the bracket segments substantially abut each other.

17. The device as claimed in claim 8, wherein the outer ends of the at least two bracket segments are moved toward each other during placing in the operative position such that in the operative position the bracket segments substantially abut each other.

18. The device as claimed in claim 6, wherein the bracket member is configured such that it substantially corresponds to at least a part of an inside of the abdominal wall of the carcass.

19. The device as claimed in claim 9, wherein the bracket member is configured such that it substantially corresponds to at least a part of an inside of the abdominal wall of the carcass.

20. A device for releasing intestines in a carcass opened on an abdominal side, comprising;

a feed device for supplying opened carcasses, a manipulator provided with at least one bracket member, wherein the manipulator is configured for placing the bracket member in an operative position between the peritoneum and the abdominal wall of the carcass, causing the bracket member to move substantially parallel to the spinal column of the carcass, and carrying the bracket member from the operative position to a position outside the carcass, and a discharge device for discharging processed opened carcasses, wherein the bracket member includes sawing means and wherein the at least one bracket member includes at least two bracket segments having outer ends that substantially abut each other.

\* \* \* \* \*

UNITED STATES PATENT AND TRADEMARK OFFICE
CERTIFICATE OF CORRECTION

PATENT NO. : 5,820,452
DATED : October 13, 1998
INVENTOR(S) : Thomas Gerardus Maria Jacobs et al.

It is certified that error appears in the above-identified patent and that said Letters Patent is hereby corrected as shown below:

Column 1 Line 3 after Title, insert --BACKGROUND OF THE INVENTION--.

Claim 5 Column 4 Line 45 "carcasse" should read --carcasses--.

Claim 6 Column 4 Lines 51-52 "columns;" should read --column,--.

Claim 9 Column 5 Lines 1-2 "substantially Parallel" should read --substantially parallel--.

Claim 20 Column 6 Line 26 after "comprising" delete ";" and insert --:--.

Signed and Sealed this

Seventeenth Day of August, 1999

Attest:

Q. TODD DICKINSON

*Attesting Officer*     *Acting Commissioner of Patents and Trademarks*